US006838492B2

(12) United States Patent
Maleeny et al.

(10) Patent No.: US 6,838,492 B2
(45) Date of Patent: Jan. 4, 2005

(54) SCENTED PAINTS, PAINT SCENTING ADDITIVE MIXTURES AND PROCESSES FOR PRODUCING SCENTED PAINTS

(75) Inventors: Robert Maleeny, Ramsey, NJ (US); Doug Vick, Boston, GA (US); James Kinney, Ramsey, NJ (US); David Ziser, Pompton Plains, NJ (US); Richard Laky, Clifton, NJ (US)

(73) Assignee: Scentco, LLC., Thomasville, GA (US)

( * ) Notice: Subject to any disclaimer, the term of this patent is extended or adjusted under 35 U.S.C. 154(b) by 246 days.

(21) Appl. No.: 10/173,486

(22) Filed: Jun. 17, 2002

(65) Prior Publication Data

US 2003/0232901 A1 Dec. 18, 2003

(51) Int. Cl.$^7$ ............................. C09K 11/12; C08K 6/00
(52) U.S. Cl. ...................... 523/122; 252/1; 106/31.02
(58) Field of Search .......................... 106/31.02; 252/1; 523/122

(56) References Cited

U.S. PATENT DOCUMENTS

| | | | | | |
|---|---|---|---|---|---|
| 3,725,555 | A | * | 4/1973 | Traber et al. | ................ 514/512 |
| 4,129,448 | A | * | 12/1978 | Greenfield et al. | ...... 106/18.32 |
| 5,078,792 | A | | 1/1992 | Hinkle et al. | |
| 6,420,455 | B1 | * | 7/2002 | Landgrebe et al. | ......... 523/122 |
| 6,528,071 | B2 | * | 3/2003 | Vatter et al. | ................ 424/401 |
| 6,562,324 | B1 | * | 5/2003 | Kumar et al. | ............ 424/70.12 |

* cited by examiner

Primary Examiner—Kriellion A. Sanders
(74) Attorney, Agent, or Firm—Jones Day

(57) ABSTRACT

Disclosed are paint scenting additive mixtures formulated to be introduced into paint compositions as a stable dispersion therein to produce a scented paint which provides a pleasant and long-lasting fragrance or aroma in an ambient surrounding where the scented paint is applied as well as processes for producing scented paints utilizing such additive mixtures and the scented products produced therewith.

32 Claims, No Drawings

SCENTED PAINTS, PAINT SCENTING ADDITIVE MIXTURES AND PROCESSES FOR PRODUCING SCENTED PAINTS

BACKGROUND OF THE INVENTION

1. Field of the Invention

The present invention relates generally to scented paints and to paint scenting additive mixtures as well as to processes for producing scented paint products. More particularly, the invention relates to additive mixtures for incorporation into unscented paints to produce scented paints which provide pleasant and long-lasting fragrance or aroma in ambient surroundings where the paints are applied and to the methods for producing scented paints employing such scenting additive mixtures.

2. Description of Related Art

There are many areas in a typical household or business environment such as in basements, kitchens, and rooms that have not been used for long periods of time or that are used to store or manufacture malodorous products where odor control is an important and desirable consideration. However, it is frequently very difficult to eliminate these odors or to modify the perception of the malodor in such spaces so that the perceived scent becomes acceptable or pleasant. For example, a mildew odor in a basement is pernicious and its perception is very difficult to eliminate or overcome with fragrance alone. Cleaning agents such as sodium hypochlorite or quaternary ammonium compounds may be effective to some degree if used in high enough concentrations.

Room deodorants, such as aerosols, stick-ups, candles, pomanders and the like may help to modify the perception of malodor but none of these forms of scenting are long lasting and in many cases they do not deliver sufficient fragrance to effectively overcome the prevalent malodors.

It has been known heretofore that paints can be somewhat effective in sealing off malodors but it has been recognized that the paints themselves frequently impart unpleasant odors and, even if they do contain a fragrance that has been added by the manufacturer, the level is so low that the fragrance is only effective to mask the inherent malodor of the paints and not to render the surroundings more pleasant in aroma over an extended period of time. That is, the fragrances have not been incorporated in the paints at sufficiently high concentration levels to enable modification and/or elimination of the perception of malodors in the ambient environment for an extended period of time after the paint has been applied and dried on the painted surface.

Thus, the general concept of adding fragrances to paints during the paint formulation process has been known heretofore. However, scented paints have been produced, heretofore, in a conventional manner by mixing a paint pigment with a standard paint solvent and adding a limited quantity of a fragrance or scenting agent thereto. For example, U.S. Pat. No. 5,078,792 (the '792 patent) describes a scented paint composition and a method of manufacturing such scented paint by mixing a paint pigment with a paint solvent and then adding a masking agent such as vanilla extract or vanillin, an inducing agent such as a formulated soap and a scent extract typically selected to match the color of the pigment. The masking agent is incorporated into the paint composition in an amount selected to minimize the natural scent of the paint to the greatest degree possible, preferably, at a concentration of between 0.03% and 0.25% of the desired volume. The preferred concentrations of the inducing agent and scent extract are comparable to the concentrations of the masking agent, each having a desired concentration of between 0.03% and 0.25% of the completed paint composition.

As described in the '792 patent, the imparted scent from the paint releases gradually while the paint remains in its liquid state so that an aesthetically pleasing scent is exhibited while the paint is being applied and thereafter, at least until the paint dries or cures on a painted surface. Thus, the predominant function of prior conventionally formulated paint compositions such as those described in the '792 patent was to decorate the environment and to mask the immediate obnoxious odor normally accompanying a freshly painted room and not to eliminate the perception of malodors or to impart a pleasant aroma in the ambient painted surroundings over an extended period of time.

Accordingly, since the primary purpose of introducing fragrance additives into prior art scented paints has been to impart aroma to the paint and not to the surrounding area, the concentration of fragrance ingredients incorporated in the paints has been low (typically, in a range of about 0.1 to about 0.3% by weight). In view of the low concentration level of the fragrance ingredients in these paints, the stability of the dispersions of the fragrances therein did not have to be high. In many instances, the amount of solvent in the paint was sufficient to dissolve the limited quantity of fragrance ingredients. In other instances, the viscosity of the prior scented paint compositions was sufficiently high so that even if the fragrance ingredients were insoluble, their rate of separation was quite slow so that the resulting composition was suitably stable without forming a true dispersion of the fragrance in the paints.

However, none of the prior scented paint compositions had a sufficiently high concentration of fragrance ingredients dispersed therein to enable immediate elimination of malodors in an environment and to achieve long term dispersion and stability of a sufficiently high level of fragrance in the paint so as to maintain enhanced aroma over a long period of time.

Furthermore, it should be recognized that prior scented paints were produced as pre-formulated, ready-to use compositions for supply to distributors and retail outlets. These pre-formulated paints presented significant inventory problems since they were not capable of being custom blended, for example, at the point of purchase or use to enable any desired fragrance or amount of fragrance to be selected and incorporated into any of a variety of different types of paints such as water based, oil based, alkyd based paints and the like at the option of the supplier and/or the consumer. Therefore, distributors and retailers were previously required to stock an extensive inventory of scented paints so that an array of paint colors and scents for each of a variety of paint types would be available at any given time to accommodate consumer demands.

Accordingly, there has existed a continuing and long felt need for an additive mixture that can be introduced into any type of pre-formulated conventional unscented paints such as water based, latex based, oil based, alkyd based paints and the like (including, but not limited to, high solids alkyds, hyperbranched alkyds, interpenetrating networks, fast drying enamels, emulsified alkyds, vinyl-acrylic latex, vinyl-vinyl branched polymers, styrene-acrylic emulsions, styrene-maleic anhydride polymers, acrylic-modified polymers and associative polymers) to produce a scented paint that eliminates malodors in an environment and achieves long lasting dispersion and stability of a sufficiently high level of fragrance therein to maintain an enhanced aroma in the environment over an extended period of time. The commercial advantages of these mixtures, among others, is that they enable paint suppliers and retailers to stock significantly reduced inventories of paints and, also, provides producers, consumers and users with a readily available option of custom blending the paints to a desired fragrance level and with a desired correspondence between color and scent, if desired.

In view of the foregoing, it is a general object of the present invention to provide paint scenting mixtures for incorporation into paint compositions that will be stable in the paints and that will impart sufficient aroma to the paint so that when the paint is applied in a normal manner in an ambient surrounding any offensive malodors will be substantially reduced and/or eliminated and a long lasting pleasant aroma will permeate in such surrounding.

Another general object is to provide processes for producing scented paints which impart pleasant and long-lasting fragrance or aroma in ambient surroundings in which they are applied by introducing a paint scenting mixture therein.

Another object is to provide paints having paint scenting mixtures incorporated therein to provide scented paints for use in decorating an environment and to reduce and/or eliminate the perception of malodors and/or to impart a pleasant aroma in the ambient painted surroundings over an extended period of time. These paints may optionally be formulated to further provide other desirable characteristics in the paints such as mildew resistance, anti-bacterial or anti-microbial activity, a glittery appearance and the like, if desired.

A further significant object is to provide paint scenting mixtures for incorporation into conventionally produced paint compositions to provide paints which contain relatively high concentrations of fragrance material that will remain distributed evenly throughout the paint and will not separate out in the container, while the paint is being applied or while the paint is drying or curing and for an extended period thereafter.

A still further important object is to provide paint scenting mixtures for incorporating fragrance components into any type of paint including water based, latex based, oil based, alkyd based paint compositions and the like (including, but not limited to, high solids alkyds, hyperbranched alkyds, interpenetrating networks, fast drying enamels, emulsified alkyds, vinyl-acrylic latex, vinyl-vinyl branched polymers, styrene-acrylic emulsions, styrene-maleic anhydride polymers, acrylic-modified polymers and associative polymers) in order to produce stable, long lasting dispersions of the fragrance materials in any of the variety of paint types.

Yet another significant object is to provide paint scenting mixtures for custom blending into any type of paint during production or at a point of purchase or use whereby any selected fragrance can be incorporated into any of a variety of different types of paints to provide paints having stable dispersions of fragrance materials therein with the fragrance materials soluble and stable in any selected type of paint. Such paint mixtures are advantageous to a paint distributor or retailer since the distributor or retailer can stock only a basic number of unscented paint compositions of each paint type and can custom blend the paints to produce any desired fragrance in any desired color of any type of paint.

These and other objects will become apparent hereinafter to those skilled in the art.

SUMMARY OF THE INVENTION

We have found that the use of relatively high concentrations of fragrance in paints can be a very effective means of overcoming malodors as well as imparting a pleasant and long lasting aroma to an area and that an effective technique for providing a paint compositions properly fragranced for this purpose is to add to the paint just prior to use, a paint scenting additive mixture that meets the aesthetic desires as well as the functional needs of a user of the paint.

Accordingly, we have determined that the above stated objects as well as further improvements over the prior art may be achieved by providing specially formulated paint scenting additive mixtures for incorporation into paint compositions and processes for producing scented paints with such mixtures included therein.

Thus, in one embodiment, the present invention is directed to a paint scenting additive mixture formulated to be introduced into a paint composition as a stable dispersion therein to produce a scented paint which provides a pleasant and long-lasting fragrance or aroma in an ambient surrounding where the scented paint is applied, the additive mixture containing a fragrance material; an emulsifier composition; and a solubilizing agent.

In a further embodiment, the present invention provides a process for producing a scented paint composition by introducing a paint scenting mixture into a paint composition containing a pigment suspended in a liquid medium. The paint scenting mixture includes: a fragrance material in an amount sufficient to at least reduce malodors in an ambient surrounding in which the paint is applied as well as to provide a long lasting pleasant aroma in such surroundings; and an emulsifier composition in an amount sufficient to promote a stable dispersion of the fragrance material in the paint composition. In another embodiment, the paint scenting mixture may further include an amount of a relatively odorless solubilizing agent which is compatible with the fragrance material, the emulsifier composition and the paint composition sufficient to assist in dispersing the fragrance material in the paint and to promote stability of the dispersion.

In a still further embodiment of this invention, a scented paint composition is provided containing a paint scenting mixture therein comprising a fragrance material; an emulsifier composition; and a solubilizing agent.

Accordingly, the present invention offers a number of significant advantages over the prior art. For example, since most fragrance materials are oils and are oil soluble, if a fragrance material is added to a paint without emulsifiers, there is a potential for separation, particularly, if the paint is water-soluble and the viscosity of the paint is low (less than 300 centipoise). However, heretofore, such paints have required individualized additive formulations to produce water based paints and separate additive formulations for use in oil based paint products and still other additive formulations for producing alkyd based paints. The amount of emulsifier needed varies with the characteristics of the paint and the fragrance oils. To be certain of good dispersion and stability, we have found that the emulsifier content of the paint additive should be in a range of about 1 to about 5% based on the weight of the paint additive mixture.

The fragrance additives described in this invention are intended to make the paint a vehicle for odor control as well as a means of decoration. Therefore, the concentration or use level of the fragrance material in the additive mixture is significantly higher than the amount of fragrance which has been employed in prior art scented paints. That is, the concentration of fragrance in the mixture may be about 0.5% to about 85% by weight of the paint scenting additive mixture, usually in a range of about 60% to about 80% by weight of the paint scenting additive mixture.

Furthermore, it is important that the fragrance should not only provide a strong aroma after the paint is applied but should also be easily dispersed into the paint and remain dispersed while the paint is being used. In addition, the ingredients of the fragrance should be selected so that the constituents of the paint do not adversely affect them nor should the constituents of the fragrance affect the constituents of the paint. Also, it should be noted that the fragrance materials employed in this invention can be used to fragrance paint that can be sold ready-to-use but it is the primary purpose of this invention to provide additives to paint that can be added by the user according to the user's preferences for aroma characteristics and fragrance level.

As there are several different solvent systems for paints such as oil soluble ingredients like turpentine and mineral oil, water and ammonia, we have found it advantageous to develop an additive system that is compatible with all types of paints, so that a user will not be faced with either a difficult process or multitude of products necessary to enable the user to create a strong, stable paint that will function not only as a decorating product but will also provide odor control.

The new paint scenting additive mixtures of this invention contain emulsifiers that assure that the fragrance will distribute evenly throughout the paint and will not separate in the container, while the paint is being applied or while the paint is drying. Since most fragrance oils are oil soluble, if fragrance is added without emulsifiers there is a potential for separation particularly if the paint is water-soluble and the viscosity of the paint is low (less than 300 centipoises).

The amount of emulsifier to be used in producing the paint scenting additive mixtures of this invention varies with the characteristics of the paint and the fragrance oils. To be certain of good dispersion and stability, the emulsifier content of the paint scenting additive mixtures should be in a range of about 1 to about 5% by weight of the additive mixture, preferably between about 1 and about 2% by weight of the of the additive mixture.

DETAILED DESCRIPTION OF A PREFERRED EMBODIMENT OF THE INVENTION

A paint scenting additive mixture of the present invention comprises a fragrance material, an emulsifier composition and a solubilizing agent. Such additive mixtures have been found to be suitable for incorporation into any one of a wide variety of paints to produce scented paint compositions. Specifically, the paint scenting additive mixtures of this invention contain a high level of fragrance material therein so that when the additive mixture is added to a compatible paint composition, the additive mixture will impart a long lasting and pleasant aroma to the painted area. Preferably, the additive mixtures should be introduced into a compatible paint composition at a concentration level in a range of about 0.5 to about 10.0% by weight of the paint composition.

Compatible paints into which the paint scenting additive mixtures of this invention may be introduced include a wide variety of types of paints such as water based, latex based, oil based or alkyd based paint compositions (including, but not limited to, high solids alkyds, hyperbranched alkyds, interpenetrating networks, fast drying enamels, emulsified alkyds, vinyl-acrylic latex, vinyl-vinyl branched polymers, styrene-acrylic emulsions, styrene-maleic anhydride polymers, acrylic-modified polymers and associative polymers) to produce a scented paint composition therefrom.

With regard to fragrance materials suitable for use in the paint scenting additive mixtures of the present invention, it should be noted that any desirable known scenting or fragrance types may be employed in such additive mixtures provided that the fragrance is compatible with the other ingredients in the mixtures. Examples of scents or fragrances for use in producing the paint scenting additive mixtures of the present invention include, but are not limited to, "Fresh and Clean" fragrance materials such as those sold under the designation F34371 by Flavor & Fragrance Specialties, Inc.; "Wildflower" fragrance materials such as those sold under the designation F34531 by Flavor & Fragrance Specialties, Inc.; "Hawaiian Beeze E.O.C.®" fragrance materials such as those sold under the designation F34372 by Flavor & Fragrance Specialties, Inc.); "Apple Spice" fragrance materials such as those sold under the designation F34535 by Flavor & Fragrance Specialties, Inc.; vanilla fragrances such as those sold under the designation 100J93 by Flavor & Fragrance Specialties, Inc.; floral fragrances such as those sold under the designation 100D56 by Flavor & Fragrance Specialties, Inc.; citrus fragrances such as those sold under the designation 200K89 by Flavor & Fragrance Specialties, Inc. and the like.

We have found that certain basic fragrance formulas such as those sold by Flavor & Fragrance Specialties, Inc. under the designation F34371, can be added to paints by themselves without other accompanying ingredients. However, we have further determined that, in general, significantly more stable dispersion of fragrance materials in paint compositions is achieved and greater compatibility of the fragrance materials in different types of paints is enabled when an emulsifier composition (also referred to as a surfactant) or a mixture of emulsifier compositions is included in the paint scenting additive mixtures.

With reference to the emulsifier or surfactant compositions for use in the additive mixtures of this invention, it should be noted that any emulsifier composition/surfactant or mixture of emulsifier compositions/surfactants that will disperse (solubilize) oil in water with a particle size of the oil less than one micron may advantageously be employed in the additive mixtures of this invention. Preferably, the emulsifier compositions/surfactants are non-ionic and contain about 2–50 moles of ethoxylation. In addition, blends of two or more emulsifier compositions/surfactants may be employed in formulating the additive mixtures.

Examples of preferred emulsifier compositions/surfactants for use in preparing the paint scenting additive mixtures of this invention are those having low odor profiles so that they will not interfere with the odor profile of the fragrance and include nonionic, ethoxylated alcohols and nonionic ethoxylated alkyl phenols such as octoxynol-9 sold by Union Carbide under the tradename Triton X-100; nonoxynol-9 sold by Union Carbide under the tradename Tergitol NP-9; nonoxynol-10 sold by Texaco under the tradename Surfonic N-95.

Exemplary of other suitable emulsifier compositions/surfactants which also may be used herein are polysorbate 20 sold by Uniqema America under the tradename Tween 20; ethoxylated PEG fatty esters such as PEG 600 distearate sold by Seabrook Industries; ethoxylated glycerine esters such as POE (2) glycerol monostearate; ethoxylated fatty acids such as POE (9) oleic acid; ethoxylated alcohols such as POE (10) cetyl alcohol; ethoxylated polyethylene glycols such as polyethylene glycol (400); linear alcohols such as ceteth 2 sold by Uniqema America under the tradename Brij 52 and steareth-20 sold by Uniqema America under the tradename Brij 78. Additional emulsifier compositions/surfactants include nonyl phenols; nonoxynol-6 sold by Texaco under the tradename Surfonic N60; nonoxynol-9 sold by Rhodia Inc. under the tradename Igepal CO630 and nonoxynol 10 sold by Union Carbide under the tradename Tergitol NP-10.

If desired, a nonionic emulsifier may be employed in combination with an anionic emulsifier or with several anionic emulsifiers in formulating the additive mixtures of this invention. Suitable nonionic emulsifiers are, in particular, polyglycol ethers of long-chain aliphatic alcohols which preferably contain 10 to 20 carbon atoms, or of alkyiphenols in which the alkyl radical preferably contains 6 to 12 carbon atoms, or of dialkyiphenols or trialkylphenols in which the alkyl radicals are preferably branched alkyl radicals having 3 to 12 carbon atoms. In each case the number of oxethylene units in these compounds is within the range of 6 to 50.

Examples of suitable emulsifier compounds are reaction products of ethylene oxide with lauryl alcohol, stearyl alcohol, oleyl alcohol, coconut oil alcohol, octylphenol, nonylphenol, diisopropylphenol, triisopropylphenol, di-t.-butylphenol and tri-s-butylphenol. Reaction products of ethylene oxide with polypropylene glycol or polybutylene glycol are also suitable.

Emulsifiers which have been found useful in the formation of the additive mixtures of the present invention are emulsifiers having a hydrophile-lipophile balance (HLB) number of from one to twelve. The HLB system is a semi-empirical procedure for the selection of an appropriate emulsifier. The procedure is based on the concept that the molecule of any emulsifier contains both hydrophobic and hydrophilic groups, and the ratio of their respective weight percentages should influence emulsification behavior.

The HLB value can be calculated from the theoretical composition of the emulsifier. For example, in determining the HLB for ethylene oxide condensation products, HLB equals one-fifth of the weight percent of the oxyethylene hydrophilic content of the molecule. The HLB of ester emulsifiers may be calculated by the formula HLB=20 (1−S/A), wherein S is the saponification of the emulsifier and A is the acid number of the fatty acid moiety. Such methods of calculation are known in the art and expressed in a wide variety of publications.

HLB values have also been determined by titration, spreading coefficients, gas-liquid chromatograph techniques and other laboratory methods. Generally, suppliers of commercial proprietary emulsifiers provide an HLB number for their products, and published HLB indices of these materials are known in the art.

According to the present invention, a single emulsifier having an HLB of about 2 to about 25, preferably about 6–15, may be used. However, a blend of emulsifiers, including a continuous phase component as well as an emulsifier for the dispersed phase, which produce an emulsifier system having an HLB of from about 2 to about 25 can be used. When two or more of these emulsifiers are to be blended, the HLB of the combination is calculated by the formula xA+ (1−x)B wherein x is the percent proportion of the emulsifier having an HLB of A and B is the HLB of the second emulsifier. It has been found that the most stable emulsion systems consist of blends of two or more emulsifiers, one portion having lipophilic tendencies (HLB 1.0 to 5.0), and the other portion having hydrophilic tendencies (HLB 5.0 to 12.0).

We have found that the rate of release of fragrance can be further affected by incorporating a suitable solubilizing agent (also referred to as a solvent) in the paint scenting additive mixtures of this invention. The use of a solubilizing agent/solvent has been found to assist in initial dispersion of the fragrance material in a paint composition and to promote the stability of such dispersion. Suitable solubilizing agents/solvents for use in preparing the additive mixtures of the present invention must be relatively odorless so that they provide no appreciable scent to the final paint scenting additive mixture and should be as neutral in effect as possible. Furthermore, the solubilizing agents/solvents must be compatible with the surface active emulsifier components and the fragrance materials in the mixture. Additionally, the solubilizing agents/solvents must be compatible with the particular type of paint into which the mixture is to be incorporated in order to achieve a long lasting, stable dispersion without plasticizing or destabilizing the paint composition.

Preferred solubilizing agents/solvents for incorporation in the additive mixtures of this invention include diethyl phthalate, dimethyl phthalate, dioctyl adipate and other esters; hexylene glycol, dipropylene glycol, butanediols such as 1,3-butanediol, 1,4-butanediaol and other polyols; and kerosene, linonene, and other hydrocarbons. Other solubilizing agents/solvents which have been found to be suitable for use in preparing the additive mixtures of this invention include triethyl acetate, dipropylene glycol, ethyl alcohol, benzyl benzoate and the like. However, diethyl phthalate is the most preferred solubilizing agent because it is a very good solvent for various fragrance materials.

In formulating the paint scenting additive mixtures of this invention, we have found that the concentration of fragrance material to be incorporated in the additive mixture may vary from about 0.5% to about 85% by weight of the mixture. Also, the concentration of the solubilizing agent in the mixture can be up to about 95% by weight of the mixture when the concentration of the fragrance material is at a low level (e.g., about 0.5%) and may be as low as about 10% by weight of the mixture when the concentration of the fragrance material is at the high end of the range (e.g., about 85%). The concentration of the emulsifier composition to be incorporated into the additive mixture should be in a range of about 1% to about 5% by weight of the mixture. Most preferably, the paint scenting additive mixtures of the present invention should contain fragrance material in an amount of about 60% to about 80% by weight of the mixture, emulsifier composition in an amount of about 1% to about 5% by weight of the mixture and solubilizing agent in an amount of about 20% to about 60% by weight of the mixture.

In addition to the basic components of the paint scenting additive mixtures of this invention, other ingredients may also be included therein to provide additional advantageous characteristics in a paint composition into which the additive mixtures are incorporated. For example, it has been found that the inclusion of a mildew preventing additive or mildewcide may be of significant value when the final scented paint composition is intended to be applied in a wet and/or damp environment to prevent the formation of mildew or rot in such surroundings.

Although it is not critical, it is preferred that any mildew-cidal agents selected for inclusion in the paint scenting additive mixtures of this invention should be soluble in the mixture and should be compatible with the other ingredients in the mixture. Furthermore, the mildewcide should at least be dispersable in the mixture even if it is not soluble therein.

Exemplary of suitable mildewcidal agents which optionally may be incorporated in the additive mixtures of the present invention include, but are not limited to the following mildewcides: 2-n-octyl-4-isothiazolin-3-one ("Skane M-8"); 3-iodo-2-propanyl butyl carbamate ("Polyphase AF-1"); tetra-chloroisophthalonitril ("Nopcocide N-96"); N-trichloromethyl thiophthalimide ("Fungitrol 11", "Folpet"); 2-(thicyanonethylthio)benzothiazole ("Busan"); tributyl tin oxide ("TBTO"); 1,2 benzisothiazolin-3-one, aqueous amine solution ("Proxel"); butadiene sulfone; butadiene polysulfone; 3,5 dimethyl tetrahydro 1,3,5,2H thiadiazine-2-thione ("Cansan S"); 2,4 dichloro-6-(O-chloroanilino)-s-triazine ("Fugritrol Alpha"); 3,5-dibromo-3'-trifluoromethyl salicanilide ("Flurophene"); 2,3,5,6-tetrachloro-4-(methylsulfonyl)pyridine ("Dow S-13"); diiodomethyl p-tolyl salons ("Amical"); 5,6-dichloro benzoazolinone-2 ("Irgasan FP"); 3,5,3',4 tetrachloro salylanilide ("Irgasan BS-200"); cyclohexylsulfamate ("Onyxide 172"); dinitro-1-methyl heptyl phenyl crotonate ("Karathane"); 2-(4-thiazolyl)benzimidazole ("Metasol TK-100"); p-toluene sulfonamide; sulfur; n-(3-chlorophenyl)itaconmide; tetra methyl thiuram disulfide ("Tuex"); trans 1,2 bis(n-propylsulfonyl)ethylene ("Vancide PA"); n-trichloromethyl tetrahydro phthalimide and zinc.

Other optional ingredients for inclusion in the additive mixtures of the present invention include coloring agents and/or glitters to further enhance the commercial appeal of a treated paint. Also, a cationic anti-bacterial or anti-microbial agent such as chlorhexidine gluconate can be included in the additive mixtures of this invention, with or without mildewcides, for the anti-bacterial/anti-microbial properties they may provide in a treated paint composition. In addition, malodor counteractants such as cyclohexyl ethyl butyrate and ethylene diamine tetra acetic acid also may advantageously be included in the paint scenting additive mixtures of the present invention.

In the process of preparing a scented paint composition incorporating the paint scenting additives therein, a paint scenting mixture in accordance with this invention is incorporated into any typical paint composition containing a pigment suspended in a liquid medium. The paint scenting mixture includes a fragrance material in an amount sufficient to at least reduce malodors in an ambient surrounding in which the paint is applied as well as to provide a long lasting pleasant aroma in such surroundings; and an emulsifier composition in an amount sufficient to promote a stable dispersion of the fragrance material in the paint composition.

The strength of the paint scenting mixtures of this invention preferably is standardized to a use level of one ounce per gallon of paint although this use level may be varied depending on the degree of fragrance that user of the paint may desire. However, at the one ounce per gallon level, it has been found that the aroma in a scented paint of this invention is pleasant and long lasting and that the amount added is convenient to handle. Also, such amount fits into a gallon can of paint without overflowing. Of course, if desired, very concentrated fragrance mixtures could be prepared for some fragrances and the use level of the mixture could be reduced to as little as ¼ ounce per gallon of paint. However, such concentrated mixtures would not be suitable for all fragrance types in order to achieve a satisfactory finished product.

Furthermore, we have found that the longevity and effectiveness of the scent or fragrance imparted by a scented paint composition containing an additive mixture of this invention is dependent on various factors including the strength and concentration of the fragrance system add, the amount of paint used, the ambient conditions of the surroundings in which the paint is applied and the particular conditions which the user is attempting to control by applying the paint, the air flow in the environment in which the paint is applied, the ambient temperature and the like.

The following examples are intended for illustration purposes only, and should not be deemed to limit the scope of the invention as defined in the appended claims.

EXAMPLE 1

A paint scenting additive mixture in accordance with the present invention was prepared by mixing 75 weight percent of a "Fresh and Clean" scented fragrance material (F34371 sold by Flavor & Fragrance Specialties, Inc.) with 1 weight percent of an emulsifier/surfactant composition (Triton X100 sold by Rohm and Haas Corporation) and 24 weight percent of a solubilizing agent/solvent (hexylene glycol).

The resulting paint scenting additive mixture was then added to a typical latex based paint at a level of 1 ounce/gallon and the paint having the additive mixture therein was hand mixed for a period of about 2–5 minutes until the additive mixture was dispersed in the paint composition. It was determined that the dispersion of the paint scenting mixture remained stable in the paint at room temperature (75 F), and at elevated temperature (110 F) and under cyclic freeze (−30 F)/thaw (75 F) conditions. When applied, it was found that the latex paint containing the paint scenting mixture of this invention exhibited excellent coverage, scuff resistance, and washability and the Fresh & Clean aroma of the treated latex paint was found to be apparent for a period of greater than 180 days.

EXAMPLE 2

A paint scenting additive mixture in accordance with the present invention was prepared by mixing 74 weight percent of a "Wildflower" scented fragrance material (F34531 sold by Flavor & Fragrance Specialties, Inc.) with 2 weight percent of an emulsifier/surfactant composition (Tergitol NP 9 sold by Union Carbide Corporation) and 24 weight percent of a solubilizing agent/solvent (diethylene phthalate).

The resulting paint scenting additive mixture was then added to a typical alkyd based gloss enamel paint at a level of 1 ounce/gallon and the paint having the additive mixture therein was hand mixed until the additive mixture was dispersed in the paint composition. It was determined that full dispersion of the paint scenting mixture in the paint composition occurred almost immediately. When compared to a control enamel paint sample containing none of the paint scenting additive of the present invention, no differences were found between the control sample and the test sample of this Example 2 in regard to paint covering power, scuff resistance, gloss and easy cleaning characteristics. Full stability testing for 90 days also showed no discernable differences. The Wildflowers aroma of the paint sample treated with the paint scenting additive of the present invention was found to be apparent for a period of greater than 180 days.

EXAMPLE 3

A paint scenting additive mixture in accordance with the present invention was prepared by mixing 75 weight percent of a "Hawaiian Beeze E.O.C.®" fragrance material (F34372 sold by Flavor & Fragrance Specialties, Inc.) with 2 weight percent of an emulsifier/surfactant composition (Surfonic 95 sold by Texaco Corporation) and 23 weight percent of a solubilizing agent/solvent (hexylene glycol). With regard to the particular fragrance material employed in this Example, the fragrance formulation included special ingredients that are malodor counteracting actives and are sold by Flavor & Fragrance Specialties, Inc. under the trademark E.O.C.® which refers to an Environmental Odor Control system that neutralizes malodors (e.g. smoke, musty damp, and animal odors).

The resulting paint scenting additive mixture was then added to a typical latex based paint at a level of 1 ounce/gallon and the paint having the additive mixture therein was hand mixed for a period of about 2–5 minutes. It was determined that the paint scenting mixture dispersed readily in the paint and remained homogeneous therein for a period of 90 days at room temperature (75 F), and at elevated temperature (110 F) and under cyclic freeze (−30 F)/thaw (75 F) conditions. Physical properties of the paint remained the same as prior to the addition of the paint scenting mixture. The enhanced aroma of the treated latex paint and the reduction of malodors in the ambient surroundings in which the paint was applied was found to be apparent for a period of greater than 180 days.

EXAMPLE 4

A series of sample paint scenting additive mixtures in accordance with the present invention were prepared by mixing 75 weight percent of an "Apple Spice" fragrance material (F34535 sold by Flavor & Fragrance Specialties, Inc.) with 1 weight percent of an emulsifier/surfactant composition (Tween 20 sold by Uniquema America) and 23 weight percent of a solubilizing agent/solvent (hexylene glycol).

In addition to the foregoing ingredients, 1 weight percent of a mildewcide was also incorporated into each of the sample paint scenting additive mixtures so that when each of these paint scenting mixtures was introduced into a paint, the paint had the ability to prevent mildew in damp areas. For purposes of this Example 4, the mildewcide incorporated into one of the sample paint scenting additive mixtures was thiazolyl benzimidazole ("Stay Clean IE" sold by Walla Walla Environmental Inc.). The mildewcide incorporated into another of the sample paint scenting additive mixtures was 3,5,3',4 tetrachloro salyanilide ("Irgasan BS-200" sold by Ciba Specialty Chemicals) and the mildewcide incorporated into another one of the sample paint scenting additive mixtures was 3-iodo-2-propanyl butyl carbamate ("Polyphase AF-1" sold by Troy Corporation).

One of each of the resulting sample paint scenting additive mixtures containing a mildewcidal agent was then added to a typical latex based paint at a 1 ounce/gallon level, with moderate hand mixing for a period of 2–5 minutes. Furthermore, another one of each of the resulting sample paint scenting additive mixtures was added to an enamel based paint also at a level of 1 ounce/gallon, with the same moderate mixing. It was found that each of the latex and enamel paints prepared by introducing these various sample paint scenting mixtures therein exhibited a fresh smell for more than 3 months, with no showing of mildew growth, and excellent coating characteristics.

While the present invention has been described in connection with its preferred forms and embodiments with a certain degree of particularity, it is to be understood and it will be apparent to those skilled in the art that the present disclosure has been made by way of example only and that numerous changes and modifications in the details of the products and processes may be made without departing from the true spirit and scope of the invention. Accordingly, it is intended by the appended claims to cover all such changes and modifications as come within the scope of the invention.

What is claimed is:

1. A paint scenting additive mixture formulated to be introduced into a pre-formulated paint composition as a stable dispersion therein to produce a scented paint which provides a pleasant and long-lasting fragrance or aroma in an ambient surrounding where the scented paint is applied, the additive mixture comprising:
   a) a fragrance material at a concentration sufficient to enable a pre-formulated paint composition having the additive mixture incorporated therein to impart a long lasting aroma in an ambient environment in which the paint composition is applied;
   b) an emulsifier composition at a concentration sufficient to promote formation of a stable dispersion of the fragrance material in the pre-formulated paint composition; and
   c) a solubilizing agent which is compatible with the fragrance material, the emulsifier composition and the pre-formulated paint composition, the solubilizing agent being present at a concentration sufficient to assist in dispersing the fragrance material in the pre-formulated paint; and to promote stability of the dispersion in the paint; and to enable the paint additive mixture to disperse in any pre-formulated paint composition selected from the group consisting of water based paints, latex based paints, oil based paints, alkyd based paints and mixtures thereof.

2. The paint scenting additive mixture of claim 1 wherein the fragrance material is present in a concentration of about 0.5% to about 85% by weight of the additive mixture.

3. The paint scenting additive mixture of claim 2 wherein the emulsifier composition is present in a concentration of about 1% to about 5% by weight of the additive mixture.

4. The paint scenting additive mixture of claim 3 wherein the solubilizing agent is present in a concentration of about 10% to about 95% by weight of the additive mixture.

5. The paint scenting additive mixture of claim 1 wherein the concentration of the fragrance material is about 60% to about 80% by weight of the additive mixture, the concentration of the emulsifier composition is about 1% to about 5% by weight of the additive mixture and the concentration of the solubilizing agent is about 20% to about 60% by weight of the additive mixture.

6. The paint scenting additive mixture of claim 1 wherein the emulsifier composition is selected from the group consisting of non-ionic emulsifiers and blends of non-ionic and anionic emulsifiers.

7. The paint scenting additive mixture of claim 6 wherein the non-ionic emulsifier contains about 2–50 moles of ethoxylation.

8. The paint scenting additive mixture of claim 1 wherein the emulsifier composition is a single emulsifier having a hydrophile-lipophile balance (HLB) number of about 2 to about 25.

9. The paint scenting additive mixture of claim 1 wherein the solubilizing agent is selected from the group consisting of diethyl phthalate, dimethyl phthalate, dioctyl adipate, hexylene glycol, dipropylene glycol, 1,3-butanediol, 1,4-butanediaol, kerosene, linonene, triethyl acetate, dipropylene glycol, ethyl alcohol, benzyl benzoate and mixtures thereof.

10. The paint scenting additive mixture of claim 1 including at least one ingredient selected from the group consisting of mildewcidal agents, anti-bacterial/anti-microbial agents, coloring agents, glitters, malodor counteractants and mixtures thereof.

11. The paint scenting additive mixture of claim 10 wherein the mildewcidal agents are selected from the group consisting of 2-n-octyl-4-isothiazolin-3-one; 3-iodo-2-propanyl butyl carbamate, tetra-chloroisophthalonitril, N-trichloromethyl thiophthalimide, 2-(thicyanonethylthio) benzothiazole, tributyl tin oxide, 1,2 benzisothiazolin-3-one, aqueous amine solution, butadiene sulfone; butadiene polysulfone; 3,5 dimethyl tetrahydro 1,3,5,2H thiadiazine-2-thione, 2,4 dichloro-6-(O-chloroanilino)-s-triazine, 3,5-dibromo-3'-trifluoromethyl salicanilide, 2,3,5,6-tetrachloro-4-(methylsulfonyl)pyridine, diiodomethyl p-tolyl salons, 5,6-dichioro benzoazolinone-2,3,5,3',4 tetrachioro salylanilide, cyclohexylsulfamate, dinitro-1-methyl heptyl phenyl crotonate, 2-(4-thiazolyl)benzimidazole, p-toluene sulfonamide, sulfur, n-(3-chlorophenyl)itaconmide, tetra methyl thiuram disulfide, trans 1,2 bis (n-propylsulfonyl) ethylene, n-trichloromethyl tetrahydro phthalimide, zinc and mixtures thereof.

12. The paint scenting additive mixture of claim 10 wherein the anti-bacterial/anti-microbial agent is a cationic anti-bacterial/anti-microbial agent.

13. The paint scenting additive mixture of claim 12 wherein the anti-bacterial/anti-microbial agent is chlorhexidine gluconate.

14. The paint scenting additive mixture of claim 10 wherein the malodor counteractants are selected from the group consisting of cyclohexyl ethyl butyrate, ethylene diamine tetra acetic acid and mixtures thereof.

15. The paint scenting additive mixture of claim 1 formulated to be introduced into a paint composition at a level of 1 ounce of the additive mixture per gallon of paint composition.

16. A process for producing a scented paint composition comprising:
a) forming a paint composition containing a pigment suspended in a liquid medium, the paint composition being selected from the group consisting of water based paints, latex based paints, oil based paints, alkyd based paints and mixtures thereof; and
b) introducing a paint scenting mixture into the paint composition;
c) the paint scenting mixture including:
   i) a fragrance material in an amount sufficient to at least reduce malodors in an ambient surrounding in which the paint is applied as well as to provide a long lasting pleasant aroma in such surroundings; and
   ii) an emulsifier composition in an amount sufficient to promote formation of a stable dispersion of the fragrance material in the paint composition; and
   iii) a solubilizing agent which is compatible with the fragrance material, the emulsifier composition and the paint composition, the solubilizing agent being present in an amount sufficient to assist in dispersing the fragrance material in the paint composition and to promote stability of the dispersion in the paint composition and to enable the paint scenting mixture to disperse in the paint composition selected from the group consisting of water based paints, latex based paints, oil based paints, alkyd based paints and mixtures thereof.

17. The process of claim 16 wherein the paint scenting mixture introduced into the paint composition includes a relatively odorless solubilizing agent.

18. The process of claim 16 wherein the paint scenting additive mixture is introduced into the paint composition at a concentration level in a range of about 0.5% to about 10.0% by weight of the paint composition.

19. The process of claim 16 wherein the fragrance material is present in a concentration of about 0.5% to about 85% by weight of the additive mixture.

20. The process of claim 19 wherein the emulsifier composition is present in a concentration of about 1% to about 5% by weight of the additive mixture.

21. The process of claim 20 wherein the solubilizing agent is present in a concentration of about 10% to about 95% by weight of the additive mixture.

22. The process of claim 16 wherein the concentration of the fragrance material is about 60% to about 80% by weight of the additive mixture, the concentration of the emulsifier composition is about 1% to about 5% by weight of the additive mixture and the concentration of the solubilizing agent is about 20% to about 60% by weight of the additive mixture.

23. The process of claim 16 wherein the emulsifier composition is selected from the group consisting of non-ionic emulsifiers and blends of non-ionic and anionic emulsifiers.

24. The process of claim 23 wherein the non-ionic emulsifier contains about 2–50 moles of ethoxylation.

25. The process of claim 16 wherein the emulsifier composition is a single emulsifier having a hydrophile-lipophile balance (HLB) number of about 2 to about 25.

26. The process of claim 16 wherein the solubilizing agent is selected from the group consisting of diethyl phthalate, dimethyl phthalate, dioctyl adipate, hexylene glycol, dipropylene glycol, 1,3-butanediol, 1,4-butanediaol, kerosene, linonene, triethyl acetate, dipropylene glycol, ethyl alcohol, benzyl benzoate and mixtures thereof.

27. The process of claim 16 wherein the paint scenting mixture includes at least one ingredient selected from the group consisting of mildewcidal agents, anti-bacterial/anti-microbial agents, coloring agents, glitters, malodor counteractants and mixtures thereof.

28. The process of claim 27 wherein the mildewcidal agents are selected from the group consisting of 2-n-octyl-4-isothiazolin-3-one; 3-iodo-2-propanyl butyl carbamate, tetra-chloroisophthalonitril, N-trichloromethyl thiophthalimide, 2-(thicyanonethylthio)benzothiazole, tributyl tin oxide, 1,2 benzisothiazolin-3-one, aqueous amine solution, butadiene sulfone; butadiene polysulfone; 3,5 dimethyl tetrahydro 1,3,5,2H thiadiazine-2-thione, 2,4 dichloro-6-(O-chloroanilino)-s-triazine, 3,5-dibromo-3'-trifluoromethyl salicanilide, 2,3,5,6-tetrachloro4-(methylsulfonyl)pyridine, diiodomethyl p-tolyl salons, 5,6-dichioro benzoazolinone-2,3,5,3',4 tetrachloro salylanilide, cyclohexylsulfamate, dinitro-1-methyl heptyl phenyl crotonate, 2-(4-thiazolyl)benzimidazole, p-toluene sulfonamide, sulfur, n-(3-chlorophenyl)itaconmide, tetra methyl thiuram disulfide, trans 1,2 bis(n-propylsulfonyl) ethylene, n-trichioromethyl tetrahydro phthalimide, zinc and mixtures thereof.

29. The process of claim 27 wherein the anti-bacterial/anti-microbial agent is a cationic anti-bacterial/anti-microbial agent.

30. The process of claim 29 wherein the anti-bacterial/anti-microbial agent is chlorhexidine gluconate.

31. The process of claim 27 wherein the malodor counteractants are selected from the group consisting of cyclohexyl ethyl butyrate, ethylene diamine tetra acetic acid and mixtures thereof.

32. The process of claim 16 wherein the paint scenting mixture is formulated to be introduced into a paint composition at a level of 1 ounce of the additive mixture per gallon of paint composition.

* * * * *